US012699528B2

(12) United States Patent
Nuthakki et al.

(10) Patent No.: US 12,699,528 B2
(45) Date of Patent: Aug. 4, 2026

(54) METHOD AND APPARATUS FOR BRINGING AN ARRAY PORT OFFLINE FOR EXECUTING IN-FLIGHT I/O REQUESTS WHILE REJECTING UPPER LAYER PROTOCOL (ULP) MESSAGES

(71) Applicant: Dell Products L.P., Round Rock, TX (US)

(72) Inventors: Krishna Deepak Nuthakki, Bangalore (IN); Jaeyoo Jung, Hopkinton, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 18/909,006

(22) Filed: Oct. 8, 2024

(65) Prior Publication Data

US 2026/0099267 A1     Apr. 9, 2026

(51) Int. Cl.
*G06F 3/00* (2006.01)
*G06F 3/06* (2006.01)

(52) U.S. Cl.
CPC ............ G06F 3/0655 (2013.01); G06F 3/061 (2013.01); G06F 3/0679 (2013.01)

(58) Field of Classification Search
CPC ....... G06F 3/0655; G06F 3/061; G06F 3/0679

IPC ........................................................ G06F 3/00
See application file for complete search history.

(56) References Cited

U.S. PATENT DOCUMENTS

| | | | | |
|---|---|---|---|---|
| 7,372,814 | B1 * | 5/2008 | Chiruvolu ............. | H04L 47/263 370/235 |
| 12,014,053 | B2 * | 6/2024 | Randolph ............. | G06F 3/0653 |
| 2009/0222573 | A1 * | 9/2009 | Grossner ............... | H04L 47/266 709/235 |

* cited by examiner

*Primary Examiner* — Tammara R Peyton
(74) *Attorney, Agent, or Firm* — Daly, Crowley, Mofford & Durkee, LLP

(57) ABSTRACT

A method for use in a storage system, comprising: receiving, at a storage processor that is part of the storage system, a notification that an array port in the storage processor is going to be brought offline, transitioning the array port into a first state in which the array port continues to execute in-flight input-output (I/O requests) while rejecting new I/O requests, wherein each rejection includes an upper layer protocol (ULP) response/status message that would cause a sender of the rejection's corresponding I/O request to select an alternative network path that connects the sender to the storage system and re-transmit the corresponding I/O request to the storage system via the alternative network path; and transitioning the array port from the first state into a second state.

11 Claims, 6 Drawing Sheets

STORAGE SYSTEM 110

STORAGE PROCESSOR 172

STORAGE PROCESSOR 172

STORAGE PROCESSOR 172

STORAGE PROCESSOR 172

STORAGE DEVICE 174

STORAGE DEVICE 174

STORAGE DEVICE 174

STORAGE DEVICE 174

STORAGE PROCESSOR 172

MEMORY 162

PROCESSOR 164

HOST BUS ADAPTERS (HBAs) 166

PORTS 168

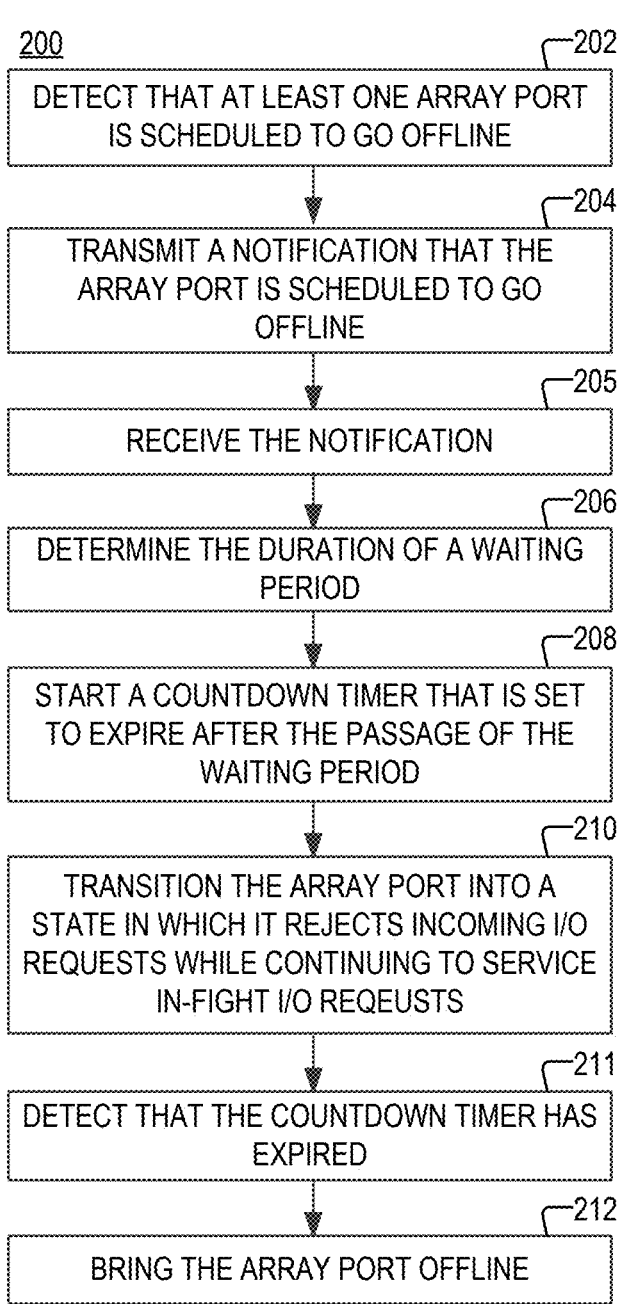

200

202

DETECT THAT AT LEAST ONE ARRAY PORT IS SCHEDULED TO GO OFFLINE

204

TRANSMIT A NOTIFICATION THAT THE ARRAY PORT IS SCHEDULED TO GO OFFLINE

205

RECEIVE THE NOTIFICATION

206

DETERMINE THE DURATION OF A WAITING PERIOD

208

START A COUNTDOWN TIMER THAT IS SET TO EXPIRE AFTER THE PASSAGE OF THE WAITING PERIOD

210

TRANSITION THE ARRAY PORT INTO A STATE IN WHICH IT REJECTS INCOMING I/O REQUESTS WHILE CONTINUING TO SERVICE IN-FIGHT I/O REQEUSTS

211

DETECT THAT THE COUNTDOWN TIMER HAS EXPIRED

212

BRING THE ARRAY PORT OFFLINE

METHOD AND APPARATUS FOR BRINGING AN ARRAY PORT OFFLINE FOR EXECUTING IN-FLIGHT I/O REQUESTS WHILE REJECTING UPPER LAYER PROTOCOL (ULP) MESSAGES

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: receiving, at a storage processor that is part of the storage system, a notification that an array port in the storage processor is going to be brought offline, transitioning the array port into a first state in which the array port continues to execute in-flight input-output (I/O requests) while rejecting new I/O requests, wherein each rejection includes an upper layer protocol (ULP) response/status message that would cause a sender of the rejection's corresponding I/O request to select an alternative network path that connects the sender to the storage system and re-transmit the corresponding I/O request to the storage system via the alternative network path; and transitioning the array port from the first state into a second state, the second state being a state in which the array port is offline, the array port being transitioned into the second state in response to detecting that a waiting period has passed since the receiving of the notification.

According to aspects of the disclosure, a storage processor that part of a storage system, the storage processor comprising: a memory; a processing circuitry that is operatively coupled to the memory, the processing circuitry being configured to perform the operations of: receiving a notification that an array port in the storage processor is going to be brought offline, transitioning the array port into a first state in which the array port continues to execute in-flight input-output (I/O requests) while rejecting new I/O requests, wherein each rejection includes an Upper Layer Protocol (ULP) response/status message that would cause a sender of the rejection's corresponding I/O request to select an alternative network path that connects the sender to the storage system and re-transmit the corresponding I/O request to the storage system via the alternative network path; and transitioning the array port from the first state into a second state, the second state being a state in which the array port is offline, the array port being transitioned into the second state in response to detecting that a waiting period has passed since the receiving of the notification.

According to aspects of the disclosure, a non-transitory computer-readable medium is provided that stores one or more processor-executable instructions, which, when executed by a processing circuitry of a storage processor, cause the processing circuitry to perform the operations of:

receiving a notification that an array port in the storage processor is going to be brought offline; transitioning the array port into a first state in which the array port continues to execute in-flight input-output (I/O requests) while rejecting new I/O requests, wherein each rejection includes an Upper Layer Protocol (ULP) response/status message that would cause a sender of the rejection's corresponding I/O request to select an alternative network path that connects the sender to a storage system and re-transmit the corresponding I/O request to the storage system via the alternative network path; and transitioning the array port from the first state into a second state, the second state being a state in which the array port is offline, the array port being transitioned into the second state in response to detecting that a waiting period has passed since the receiving of the notification.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a flowchart of an example of a process, according to aspects of the disclosure.

DETAILED DESCRIPTION

Figure 1A:
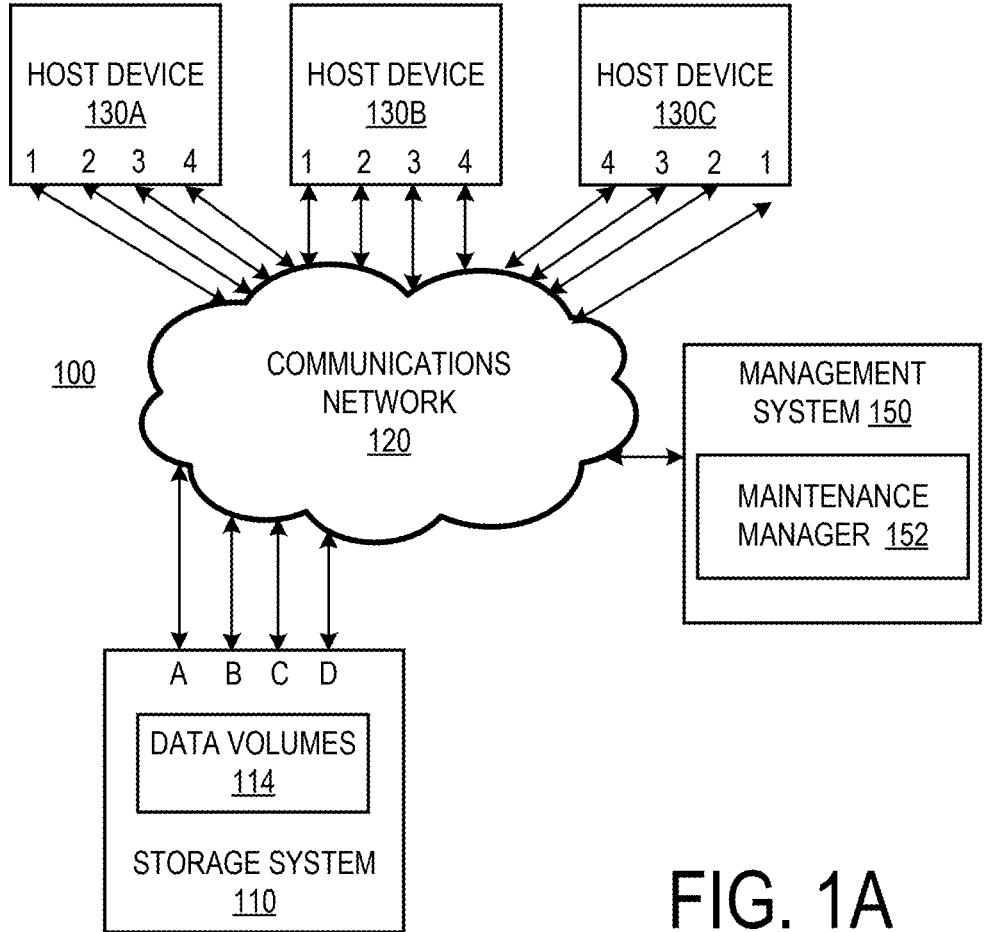
FIG. 1A is a diagram of an example of a system, according to aspects of the disclosure.

FIG. 1A is a diagram of an example of a system 100, according to aspects of the disclosure. As illustrated, system 100 may include a storage system 110 that is coupled to a plurality of host devices 130A-C and a management system 150 via a communications network 120. According to the present example, each of the host devices 130A-C is a server that is configured to access the storage system 110 for its data storage needs. Additionally or alternatively, in some implementations, each of the host devices 130A-C may be the same or similar to the computing device 300, which is discussed further below with respect to FIG. 3. Management system 150 may include any suitable type of computing device that is arranged to manage one or more aspects of the operation of storage system 110. Management system 150 may be the same or similar to the computing device 300, which is discussed further below with respect to FIG. 3. Storage system 110 may include any suitable type of storage system. In one example, storage system 110 may be configured as discussed further below with respect to FIG. 1B.

Storage system may include a plurality of ports, which are enumerated as ports A-D. Each port A-D may be provided by a respective host bus adapter (HBA) that is part of one of the storage processors in the storage system 110. Under the nomenclature of the present disclosure, ports A-D are also referred to as "array ports". Although, in the present example, storage system 110 is depicted as including four array ports, in most practical applications storage system 110 would have a larger number of ports.

Figures 1B, 1C:
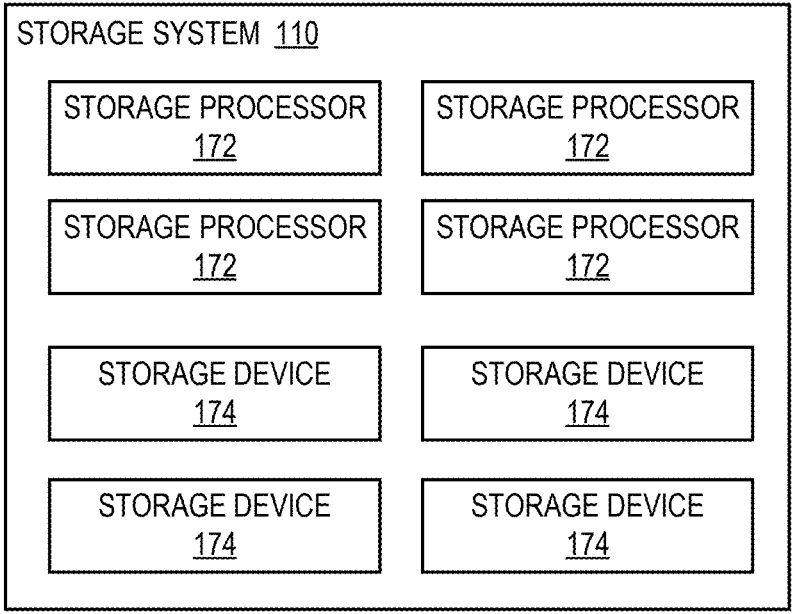
FIG. 1B is a diagram of an example of a storage system, according to aspects of the disclosure.
FIG. 1C is a diagram of an example of a storage processor, according to aspects of the disclosure.

FIG. 1B is a diagram of storage system 110, according to aspects of the disclosure. As illustrated, the storage system 110 may include a plurality of storage processors 172 and a plurality of storage devices 174. Each of the storage devices 174 may include a hard disk (HD), a solid-state drive (SSD), a non-volatile random-access memory (NVRAM) device, a non-volatile memory express (NVME) device, and/or any other suitable type of storage devices. Each of the storage processors 172 may be configured to execute I/O requests that are received at storage system 110 from host devices 130A-C by reading or writing data to the storage devices 174. An example of one possible configuration of any of the storage processors 172 is discussed further below with respect to FIG. 1C.

Returning to FIG. 1A, management system 150 may include any suitable type of computing device that is configured to control one or more aspects of the operation of storage system 110. In some implementations, management system 150 may be a computing device, such as the computing device 300, which is discussed further below with respect to FIG. 3. Additionally or alternatively, in some implementations, management system 150 may be a management console that is configured to execute a maintenance manager 152. Maintenance manager 152 may include any suitable type of software that is configured to manage and/or control storage processors 172. For example, manager 152 may be configured to bring offline any of the storage processors 172 for the purposes of performing maintenance on the storage processor 172. Additionally or alternatively, manager 152 may be configured to bring offline one or more individual components of a storage processor 172 for the purposes of performing maintenance. Each individual component may be a software component or a hardware component. In one example, any of the components may be an HBA 166, for the purposes of performing maintenance. Additionally or alternatively, in some implementations, management system 150 may be configured to close one or more of the ports 168 and/or otherwise render the ports unavailable.

A definition is now provided for the phrase "bringing an array port offline". According to the present disclosure, the phrase "bringing an array port offline" may refer to any action that causes the array port to become unavailable for servicing input-output (I/O) requests. By way of example, the phrase "bringing an array port offline" may refer to one or more of: (i) powering down or otherwise turning off a storage processor of which the array port is part, (ii) powering down or otherwise turning off an HBA of which the array port is part, (iii) closing the array port, or (iv) terminating or otherwise disabling software that reads data on the array for the purposes of executing I/O requests that are associated with the array port.

A definition is now provided for the phrase "rejecting an I/O request". According to the present disclosure, the phrase "rejecting an I/O request" may refer to the transmission of a upper layer protocol (ULP) response/status message which indicates that the I/O request cannot be completed successfully and causes the sender of the I/O request (e.g., one of host devices 130A-C) to identify an alternative network path to the storage system (e.g., storage system 110) and re-transmit the I/O request over the alternative network path. When the I/O request is a Small Computer System Interface (SCSI) I/O request, the response/status message may be a Qfull message. When the I/O request is a Non-Volatile Memory Express (NVME) request, the response/status message may be a "namespace not ready" message. In general, SCSI and NVMe are examples of Upper Layer Protocols (ULPs). Protocol Data Units (PDUs) of these protocols are transported using transport layer protocols. For SCSI, examples of transport layer protocols that can be used include FCP (Fibre Channel Protocol) and TCP/IP (iSCS). For instance, FCP may wrap the SCSI messages in FCP frames for transporting over an FC (Fibre Channel) physical layer. Similarly, for NVME, examples of transport layer protocols include, NVMe/TCP and NVMe-oF (NVMe over Fabric).

A definition is now provided for the phrase "causing an array port to reject I/O requests". According to the present disclosure, this phrase refers to any action that causes the HBA of which the array port is part to reject I/O requests that are associated with this array port. The rejection of I/O requests may be performed autonomously, in the ULP layer, by the HBA (or the on-board controller of the HBA), without the HBA (or controller) having to wait for an instruction from the CPU of the storage processor of which the HBA is part.

In one example, the phrase "causing an array port to reject I/O requests" may refer to any action that transitions the HBA of which the array port is part into a state, such as the state 196, which is discussed further below with respect to FIG. 1E. In this state, the HBA may respond with a QFull message to any incoming request associated with the array port irrespective of whether a queue associated with the array port is full. For example, the HBA may respond with a QFull message when the queue is not full. As another example, when in the state, the HBA may respond with a "namespace not ready message" to any incoming I/O requests associated with the array port, irrespective of whether a storage object associated with the array port is initialized. For instance, the HBA may respond with a "namespace not ready" message to incoming requests even when the namespace is initialized.

In one example, the management system 150 may cause an array port to begin rejecting I/O requests by transmitting to the storage processor of which the array port is part an instruction which, when executed by the storage processor, causes the HBA of which the array port is part to enter a state in which it rejects I/O requests associated with the port. In another example, a central processing unit (CPU) of a storage processor may cause an array port to begin rejecting I/O requests by providing the HBA of which the array port is part with an instruction, which when executed by the HBA, causes the HBA to enter a state in which it rejects I/O requests associated with the port.

A definition is now provided for the phrase "servicing an I/O request by an I/O port". According to the present disclosure, this phrase refers to using the port to transmit messages associated with the I/O request for purposes other than rejecting the I/O request. Such messages may include an acknowledgment that the I/O request is completed successfully (when the I/O request is a write request). As another example, the messages may include messages containing user data that is requested to be retrieved (when the I/O request is a read request").

A definition is now provided for the phrase "notification that an array port is going to be brought offline". According to the present disclosure, this phrase refers to any set of one or more messages that are indicative that the port is going to become unavailable. For example, the notification may be a message indicating that the storage processor of which the array port is part is going to be powered down. Such a message may or may not identify the array port specifically. As another example, the notification may be a message indicating that an HBA of which the array port is part would be turned off (or otherwise deactivated). Such message may or may not identify the array port specifically. As yet another example, the notification may be a message indicating that software that reads data on the array port is going to be terminated (or otherwise disabled). Such message may or may not reference the array port specifically. As yet another example, the notification may be a message that identifies the array port specifically. According to the present example, when the array port is identified specifically by the notification, the notification includes a unique identifier that belongs to the array port, such as a world wide name (WWN). According to the present example, when the notification does not identify the array port specifically, the notification contains no information that could be used to distinguish the array port from another array port that is part of the same storage processor.

According to the present disclosure, a notification that an array port is going to be brought offline may be transmitted before the array port is brought offline. In some implementations, the notification may include one or more of a time when the array port is going to be brought offline. In another example, the notification may include an indication of the duration of a waiting period after which the array port is going to be brought offline. The waiting period may start at an instant corresponding to a timestamp of the notification and end at an instant when the array port is going to be brought offline.

FIG. 1C is a diagram of an example of a storage processor 172, according to aspects of the disclosure. As illustrated, storage processor 172 may include a memory 162, a processor 164, and one or more host bus adapters (HBAs) 166. Memory 162 may include one or more of a hard disk (SD), a solid-state drive (SSD), a random-access memory (RAM), Double Data Random Access Memory (DDRAM), and/or any other suitable type of volatile or non-volatile memory. The processor 164 may include one or more general-purpose processors, such as x86 processors, Xeon™ processors, and/or any suitable type of processors. Additionally or alternatively, the processor 164 may include one or more application-specific circuits, and/or any other suitable type of processing circuitry. HBAs 166 may include one or more Fibre Channel (FC) HBAs, one or more InfiniBand HBAs, and/or any other suitable type of HBA. Each of the HBAs 166 may include one or more ports 168. Each port 168 may be referred to as an array port. Each port 168 may be the same or similar to any of array ports A-D, which are discussed above with respect to FIG. 1A. Each port 168 may be coupled via a physical line to one of the switches in network 120. According to the present disclosure, the term "processing circuitry" may refer to any electronic circuitry that is available in the storage circuitry. For example, the term "processing circuitry" may refer to one or more the CPU of the storage processor and/or the on-board controller of one of the HBAs in the storage processor.

Figure 1D:
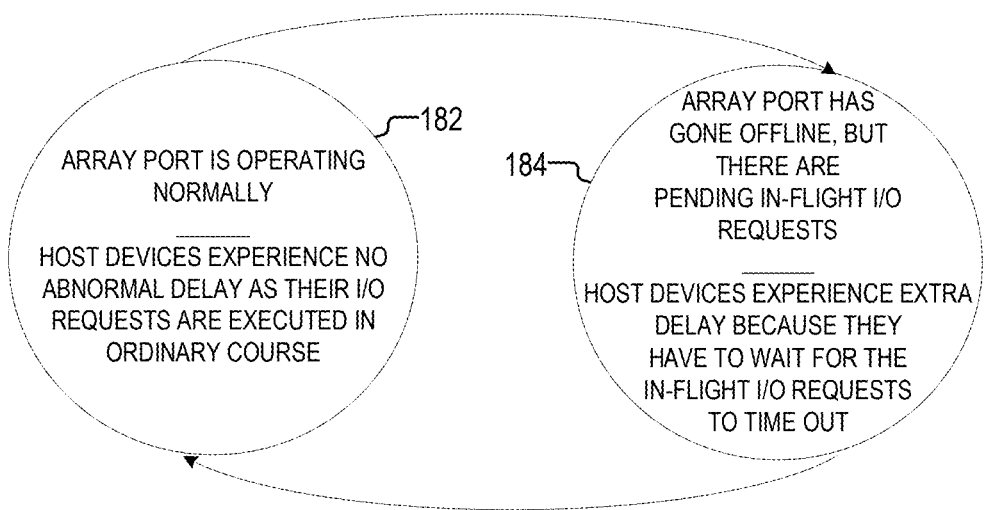
FIG. 1D is a state diagram illustrating aspects of the operation of the system of FIG. 1A, according to the prior art.

FIG. 1D is a state diagram illustrating the operation of an array port, according to the prior art. The array port may be any of the array ports in storage system 110. In the example of FIG. 1D, the array port can assume one of a state 182 or a state 184. When in state 182, the array port operates normally and host devices 130A-C experience no extra delay with respect to I/O requests that are associated with the array port. In other words, the I/O requests are executed in an ordinary manner. When in state 184, the array port is offline, and one or more in-flight I/O requests are left in a limbo. The in-flight I/O requests may be requests that were received before the array port is brought offline and were still pending when the array port was brought offline. These requests can no longer be completed with the array port after the array port is brought offline. So, the host device that transmitted any of the in-flight I/O requests (e.g., one of host devices 130A-C) would have to wait for the in-flight I/O request to time out before retransmitting the I/O request to other array ports. In other words, in state 184, the duration of the time-out period is automatically added to the delay (or latency) of the in-flight I/O requests, which in turn decreases the overall quality-of-service of storge system 110.

Figure 1E:
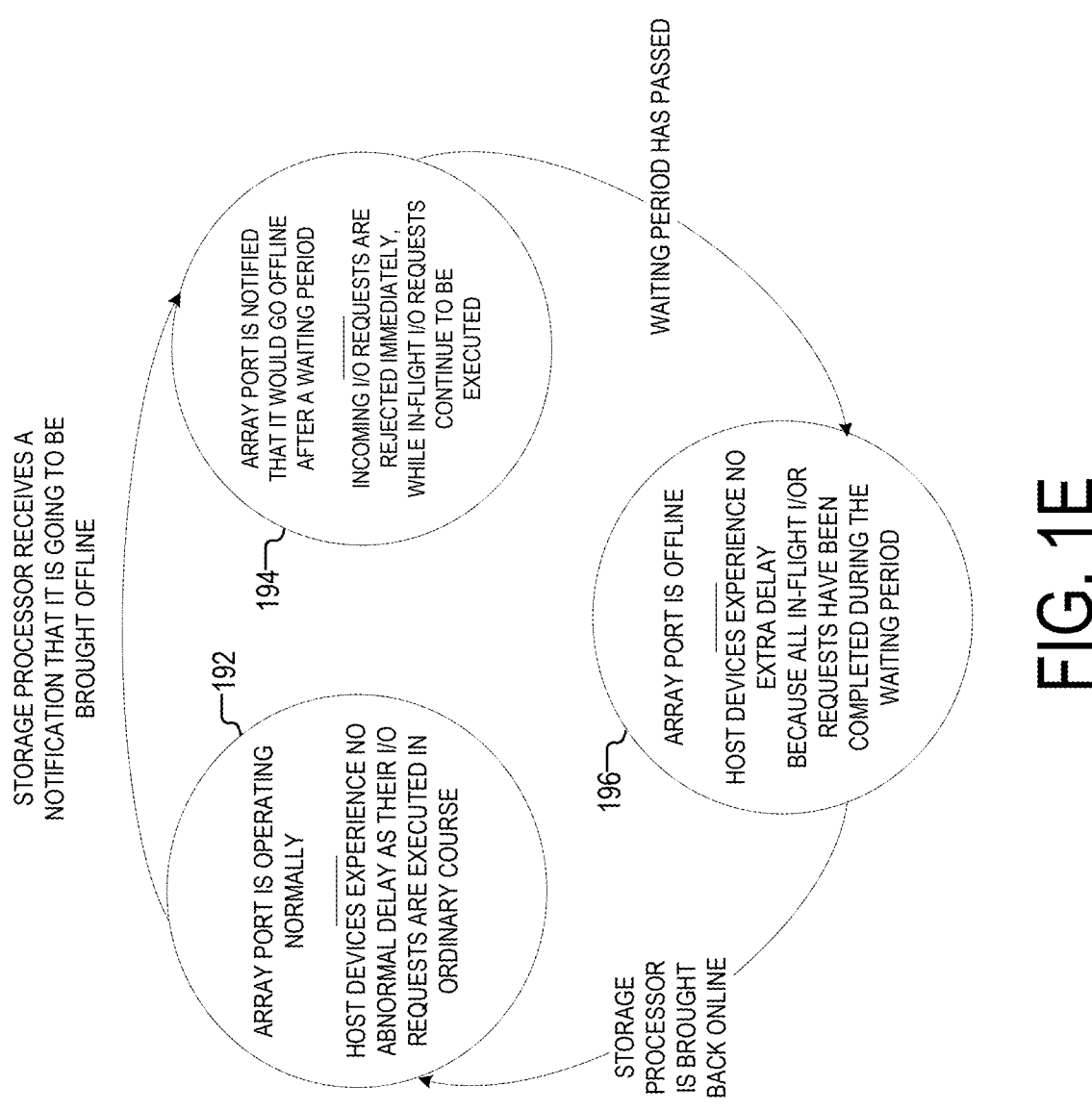
FIG. 1E is a state diagram illustrating aspects of the operation of the system of FIG. 1A, according to aspects of the disclosure.

FIG. 1E is a state diagram illustrating the operation of an array port, according to the present disclosure. FIG. 1E is provided to illustrate an example of a process for bringing an array port offline, without incurring the performance penalty that results from host devices having the wait for in-flight I/O requests to time out The array port may be any of the array ports in storage system 110.

In the example of FIG. 1E, the array port can assume one of three possible states, which are herein enumerated as state 192, state 194, and state 196. When in state 192, the array port operates normally and host devices 130A-C experience no extraordinary delay with respect to I/O requests that are associated with the array port. The array port may transition from state 192 into state 194 in response to the storge processor of which the array port is part receiving a notification that the array port is going to be brought offline. The notification may be received from manager 152 and/or any other entity.

When in state 194, the array port continues to service in-flight I/O requests. However, the array port may reject any new I/O requests that are associated with the array port. As used herein, the term "in-flight I/O request" refers to any I/O request that is received before the notification that the array port is going to be brought offline, and which has not been completed before the receipt of the notification. The array port may transition from state 194 into state 196 in response to detecting that a waiting period has passed. The waiting period may be long enough to allow all (or most) in-flight I/O requests that are associated with the array port to be completed. In this regard, in most (if not all) instances, all in-flight I/O requests would be completed before the array port transitions to state 196.

When in state 196, the array port is offline. However, because the array port has spent time in state 194, there are no in-flight I/O requests that are associated with the array port. Furthermore, when the array port goes offline, there may be signaling transmitted from the array port which notifies the switches in network 120 that the array port is going offline. So, any further I/O requests that are associated with the array port may be rejected in short order by the network (instead of the host device transmitting the I/O requests having to wait for the I/O requests to time out).

The process of FIG. 1E is advantageous, in comparison to the process of FIG. 1D, because it decreases the latency at which I/O requests are executed. Specifically, the process of FIG. 1E reduces (or ideally eliminates) the possibility that there would be pending in-flight I/O requests associated with the array port when the array port is brought offline. This in turn reduces the likelihood that the storage system would incur a performance penalty as a result of a host device having to wait for an in-flight I/O request to time out before re-transmitting the I/O request.

FIG. 2 is a flowchart of an example of a process 200, according to aspects of the disclosure. According to the present example, process 200 is performed by manager 152. However, the present disclosure is not limited to any specific entity or set of entities performing the process 200.

At step 202, manager 152 detects that an array port is scheduled to go offline. In some implementations, detecting that the array port is scheduled to go offline includes processing a maintenance schedule which indicates that the array port is scheduled to go offline. The maintenance schedule may provide that a storage processor (or an HBA or another component) of which the array port is part is scheduled for maintenance. The maintenance schedule may be stored in the memory of manager 152 or at any suitable location. In some implementations, the maintenance schedule may identify the time when the storage processor (or component thereof) is scheduled be turned off or otherwise deactivated. In such implementations, the maintenance schedule may be stored in the memory of manager 152 and it provide an identifier of the storage processor, which is subsequently used by the manager 152 to search a secondary database (not shown) to identify which ports are part of the storage processor. The secondary database may map an identifier of the storage processor to the respective identifiers of each of a plurality of array ports that are provided by the storage processor. Additionally or alternatively, in some implementations, detecting that the array port is scheduled to go offline may include receiving user input indicating that a storage processor (or an HBA or another component of the storage processor) is scheduled to go offline. The user input may identify the time when the storage processor is scheduled to go offline. In some implementations, manager 152 may search a secondary database that (not shown) or use another means to identify which ports are part of the storage processor. The secondary database may map an identifier of the storage processor to the respective identifiers of each of a plurality of array ports that are provided by the storage processor.

At step 204, manager 152 transmits a notification that the storage port is going to be brought offline. The notification may be the same or similar to any of the notifications described above with respect to FIG. 1A.

At step 205, the notification is received at the storage processor of which the array port is part.

At step 206, in response to the notification, the controller of the HBA of which the array port is part determines the duration of a waiting period. In one example, determining the duration of the waiting period may include retrieving from a memory an indication of the duration. In this example, the duration of the waiting period may be specified statically as one of the configuration settings of the HBA. In another example, the duration of the waiting period may be determined dynamically based on the number of in-flight requests for the array port that are currently pending. In some implementations, the duration may be determined in accordance with the equation of $D=IF*K$, where D is the duration, IF is the number of in-flight requests and K is a constant. In yet another example, the duration may be retrieved based on information that is contained in the notification (received at step 204). In yet another example, the duration may be determined based on an indication of a time when the array port is going to be brought offline, which is contained in the notification. Although, in the present example, step 206 is performed by the on-board controller of the HBA of which the array port is part, in alternative implementations, step 206 may be performed by the CPU of the storage processor of which the HBA is part.

At step 208, the controller of the HBA of which the array port is part starts a countdown timer. The countdown timer is scheduled to expire at the end of the waiting period (identified at step 206). Although, in the present example, step 206 is performed by the on-board controller of the HBA of which the array port is part, in alternative implementations, step 206 may be performed by the CPU of the storage processor of which the HBA is part.

At step 210, the array port enters a state in which it rejects all in-coming I/O requests while it continues to service any in-flight I/O requests. The state may be the same or similar to state 194, which is discussed above with respect to FIG. 1E.

At step 211, the array port detects that the countdown timer has expired.

At step 212, in response to detecting that the countdown timer has expired, the controller of the HBA of which the array port is part brings the array port offline. Although, in the present example, step 206 is performed by the on-board controller of the HBA of which the array port is part, in alternative implementations step 206 may be performed by the CPU of the storage processor of which the HBA is part.

FIG. 2 is provided as an example only. At least some of the steps discussed with respect to FIG. 2 may be performed in a different order, in parallel, or altogether omitted. For example, in some implementations, the timer (discussed with respect to step 208) may be started by manager 152, after which, upon the expiration of the timer, manager 152 may bring the array port offline by transmitting an instruction to the storage processor of which the array port is offline. In such implementations, prior to bringing the array port offline, manager 152 may cause the array port to transition into a state that is the same or similar to state 194, which is discussed above with respect to FIG. 1A. For example, manager 152 may transmit to the storage processor of which the array port is part an execution, which, when instructed by the storage processor, causes the array port to enter a state in which it reject incoming I/O requests while continuing to service in-flight I/O requests.

In some implementations, the notification (received at step 202) may indicate that the storage processor of which the array port is part is going to be brought offline. In response to the notification, the storage processor may execute steps 206-212 for each of the array ports in the storage processor. Specifically, the storage processor may transition each of the array ports to a state that is the same or similar to state 194, after which, following the passage of a waiting period, the storage processor may bring each of the array ports offline. In some implementations, the waiting period that passes before each array port is brought offline may be different for each array port. For example, when the waiting period for each array port is determined based on the number of in-flight I/O requests for that array port, the storage processor may wait for different amounts of time before bringing offline different array ports.

In some implementations, the notification (received at step 202) may indicate that the HBA of which the array port is part is going to be brought offline. In response to the notification, the HBA controller (or the CPU of the storage processor of which the HBA is part) may execute steps 206-212 for each of the array ports in the HBA. Specifically, the HBA controller (or CPU) may transition each of the array ports to a state that is the same or similar to state 194, after which, following the passage of a waiting period, the HBA may bring offline each of the array ports that are part of the HBA. As noted above, in some implementations, the waiting period that passes before each array port is brought offline may be different for each array port.

Figure 3:
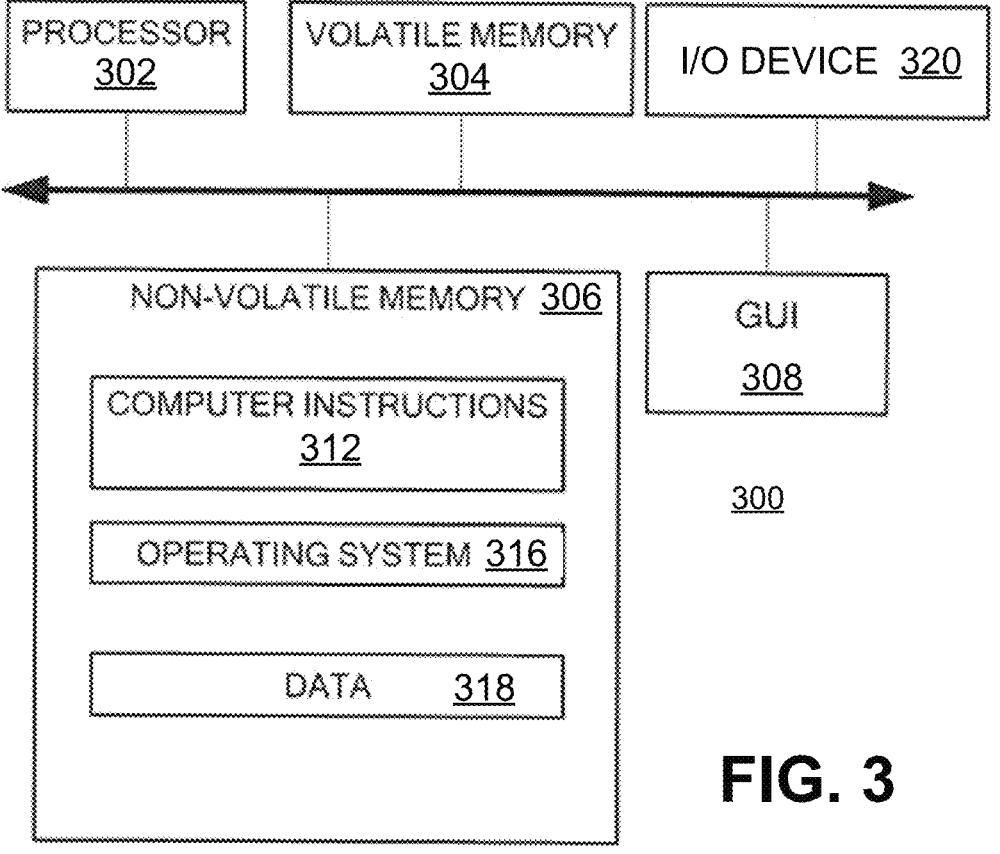
FIG. 3 is a diagram of an example of a computing device, according to aspects of the disclosure.

Referring to FIG. 3, in some embodiments, a computing device 300 may include processor 302, volatile memory 304 (e.g., RAM), non-volatile memory 306 (e.g., a hard disk drive, a solid-state drive such as a flash drive, a hybrid magnetic and solid-state drive, etc.), graphical user interface (GUI) 308 (e.g., a touchscreen, a display, and so forth) and input/output (I/O) device 320 (e.g., a mouse, a keyboard, etc.). Non-volatile memory 306 stores computer instructions 312, an operating system 316 and data 318 such that, for example, the computer instructions 312 are executed by the processor 302 out of volatile memory 304. Program code may be applied to data entered using an input device of GUI 308 or received from I/O device 320.

FIGS. 1A-3 are provided as an example only. In some embodiments, the term "I/O request" or simply "I/O" may be used to refer to an input or output request. At least some of the steps discussed with respect to FIGS. 1-5 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks".

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising: receiving, at a storage processor that is part of the storage system, a notification that an array port in the storage processor is going to be brought offline, the notification contains an indication of the length of the waiting period; transitioning the array port into a first state in which the array port continues to execute in-flight input-output (I/O requests) while rejecting new I/O requests, wherein each rejection includes an upper layer protocol (ULP) response/status message that would cause a sender of the rejection's corresponding I/O request to select an alternative network path that connects the sender to the storage system and re-transmit the corresponding I/O request to the storage system via the alternative network path; and transitioning the array port from the first state into a second state, the second state being a state in which the array port is offline, the array port being transitioned into the second state in response to detecting that the waiting period has passed since the receiving of the notification, wherein the notification indicates that the storage processor is going to be shut down, without identifying the array port or identifies the array port specifically.

2. The method of claim 1, wherein the ULP response/status message includes a Small Computer System Interface (SCSI) QFull message that is transmitted irrespective of whether a queue associated with the QFull message is full.

3. The method of claim 1, wherein the ULP response/status message includes a Non-Volatile Memory Express (NVMe) "Namespace Not Ready" message that is transmitted irrespective of whether a storage object associated with the message is initialized.

4. The method of claim 1, wherein the length of the waiting period is determined based on a count of in-flight I/O requests that are associated with the array port.

5. A storage processor that part of a storage system, the storage processor comprising: a memory; a processing circuitry that is operatively coupled to the memory, the processing circuitry being configured to perform the operations of: receiving a notification that an array port in the storage processor is going to be brought offline, the notification contains an indication of the length of the waiting period; transitioning the array port into a first state in which the array port continues to execute in-flight input-output (I/O requests) while rejecting new I/O requests, wherein each rejection includes an Upper Layer Protocol (ULP) response/status message that would cause a sender of the rejection's corresponding I/O request to select an alternative network path that connects the sender to the storage system and re-transmit the corresponding I/O request to the storage system via the alternative network path; and transitioning the array port from the first state into a second state, the second state being a state in which the array port is offline, the array port being transitioned into the second state in response to detecting that the waiting period has passed since the receiving of the notification, wherein the notification indicates that the storage processor is going to be shut down, without identifying the array port or identifies the array port specifically.

6. The storage processor of claim 5, wherein the ULP response/status message includes a Small Computer System Interface (SCSI) QFull message that is transmitted irrespective of whether a queue associated with the QFull message is full.

7. The storage processor of claim 5, wherein the ULP response/status message includes a Non-Volatile Memory Express (NVMe) "Namespace Not Ready" message that is transmitted irrespective of whether a storage object associated with the message is initialized.

8. The storage processor of claim 5, wherein the length of the waiting period is determined based on a count of in-flight I/O requests that are associated with the array port.

9. A non-transitory computer-readable medium storing one or more processor-executable instructions, which, when executed by a processing circuitry of a storage processor, cause the processing circuitry to perform the operations of: receiving a notification that an array port in the storage processor is going to be brought offline, the notification contains an indication of the length of the waiting period; transitioning the array port into a first state in which the array port continues to execute in-flight input-output (I/O requests) while rejecting new I/O requests, wherein each rejection includes an Upper Layer Protocol (ULP) response/status message that would cause a sender of the rejection's corresponding I/O request to select an alternative network path that connects the sender to a storage system and re-transmit the corresponding I/O request to the storage system via the alternative network path; and transitioning the array port from the first state into a second state, the second state being a state in which the array port is offline, the array port being transitioned into the second state in response to detecting that the waiting period has passed since the receiving of the notification, wherein the notification indicates that the storage processor is going to be shut down, without identifying the array port or identifies the array port specifically.

10. The non-transitory computer-readable medium of claim 9, wherein the ULP response/status message includes a Small Computer System Interface (SCSI) QFull message that is transmitted irrespective of whether a queue associated with the QFull message is full.

11. The non-transitory computer-readable medium of claim 9, wherein the ULP response/status message includes a Non-Volatile Memory Express (NVMe) "Namespace Not Ready" message that is transmitted irrespective of whether a storage object associated with the message is initialized.

* * * * *